(12) United States Patent
Mori

(10) Patent No.: US 11,631,194 B2
(45) Date of Patent: Apr. 18, 2023

(54) IMAGE PROCESSING APPARATUS THAT PERFORMS RECOGNITION PROCESSING, CONTROL METHOD THEREOF, AND STORAGE MEDIUM

(71) Applicant: CANON KABUSHIKI KAISHA, Tokyo (JP)

(72) Inventor: Kensaku Mori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 443 days.

(21) Appl. No.: 17/016,854

(22) Filed: Sep. 10, 2020

(65) Prior Publication Data

US 2021/0090293 A1 Mar. 25, 2021

(30) Foreign Application Priority Data

Sep. 20, 2019 (JP) .............................. JP2019-171076

(51) Int. Cl.
*G06N 20/00* (2019.01)
*G06T 7/73* (2017.01)
*B25J 9/16* (2006.01)
*G06V 10/44* (2022.01)

(52) U.S. Cl.
CPC .............. *G06T 7/75* (2017.01); *B25J 9/1697* (2013.01); *G06N 20/00* (2019.01); *G06V 10/44* (2022.01)

(58) Field of Classification Search
None
See application file for complete search history.

(56) References Cited

U.S. PATENT DOCUMENTS

| 9,990,733 | B2 | 6/2018 | Tsuji | |
| 10,042,426 | B2* | 8/2018 | Kamamori | G06V 40/107 |
| 2016/0093038 | A1* | 3/2016 | Arai | G06T 7/90 |
| | | | | 382/103 |

FOREIGN PATENT DOCUMENTS

JP 2016213744 A 12/2016

OTHER PUBLICATIONS

Girshick "Rich feature hierarchies for accurate object detection and semantic segmentation" Computer Vision Foundation. 2014: pp. 1-8. Cited in the specification.

* cited by examiner

*Primary Examiner* — Dov Popovici
(74) *Attorney, Agent, or Firm* — Rossi, Kimms & McDowell LLP

(57) ABSTRACT

An image processing apparatus that processes an image of a recognition target on a mounting surface captured by an image pickup apparatus, the image processing apparatus includes an extraction unit configured to extract an area from the image based on a first distance from the recognition target to the image pickup apparatus, a height of a designated recognition target, and a second distance from the image pickup apparatus to the mounting surface, and a recognition unit configured to perform recognition processing on the area.

12 Claims, 11 Drawing Sheets

SHOOTING ENVIRONMENT

CAPTURED IMAGE (A + B IMAGE)

PARALLAX IMAGE (A AND B IMAGES)

DISTANCE INFORMATION

MASK IMAGE DATA

RECOGNITION IMAGE

SHOOTING ENVIRONMENT

CAPTURED IMAGE

PARALLAX IMAGE

GENERATE DISTANCE INFORMATION FROM PARALLAX IMAGE

DISTANCE INFORMATION

MASK IMAGE DATA

DETECT ARTICLE POSITION AND NUMBER OF ARTICLES

ARTICLE POSITION INFORMATION

CONVERT INTO IMAGE

POSITION IMAGE

GENERATE RECOGNITION IMAGE

RECOGNITION IMAGE

IMAGE PROCESSING APPARATUS THAT PERFORMS RECOGNITION PROCESSING, CONTROL METHOD THEREOF, AND STORAGE MEDIUM

BACKGROUND OF THE INVENTION

Field of the Invention

The present invention relates to an image processing apparatus that performs recognition processing, a control method thereof, and a storage medium.

Description of the Related Art

In recent years, in factories and the like, automation of work such as product assembly and measurement has been attempted using robots. For example, an image pickup apparatus such as a camera images the state of an article conveyed by a belt conveyor, and a predetermined image processing apparatus performs image processing to automatically recognize the state of the article. Then, a predetermined robot selects the articles according to the recognized state of the articles.

As a related technology, a technology disclosed in Japanese Laid-Open Patent Publication (kokai) No. 2016-213744 has been proposed. In this technology, a subject area determined in the past and distance information related to an input image are acquired, and a distance range in which the subject may exist is set. Additionally, in this technology, a subject area related to a tracking subject is determined from the set distance range and candidate areas of the tracking subject.

When work is automated by performing image processing on an article conveyed by the belt conveyor, it is required to recognize the position and quality state of the article with high accuracy. For example, recognition processing of an article can be performed using a convolutional neural network (hereinafter referred to as CNN). When recognizing an article by a CNN, an enormous amount of arithmetic processing is performed, so that the time required for the recognition processing of the article becomes long. For this reason, it is difficult to recognize a plurality of articles successively conveyed by the belt conveyor. In particular, in a case where the performance of the CPU or GPU that performs CNN calculation is low, it is difficult for the CNN to recognize the successively conveyed articles. The above problem also occurs when performing recognition processing that does not use machine learning.

SUMMARY OF THE INVENTION

An aspect of the present invention is to efficiently recognize a work target article.

Accordingly, the present invention provides an image processing apparatus that processes an image of a recognition target on a mounting surface captured by an image pickup apparatus, the image processing apparatus including an extraction unit configured to extract an area from the image based on a first distance from the recognition target to the image pickup apparatus, a height of a designated recognition target, and a second distance from the image pickup apparatus to the mounting surface, and a recognition unit configured to perform recognition processing on the area.

According to the present invention, it enables to efficiently recognize a work target article.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

However, the configuration described in each of the following embodiments is merely an example, and the scope of the present invention is not limited by the configuration described in each of the embodiments.

First Embodiment

Figure 1:
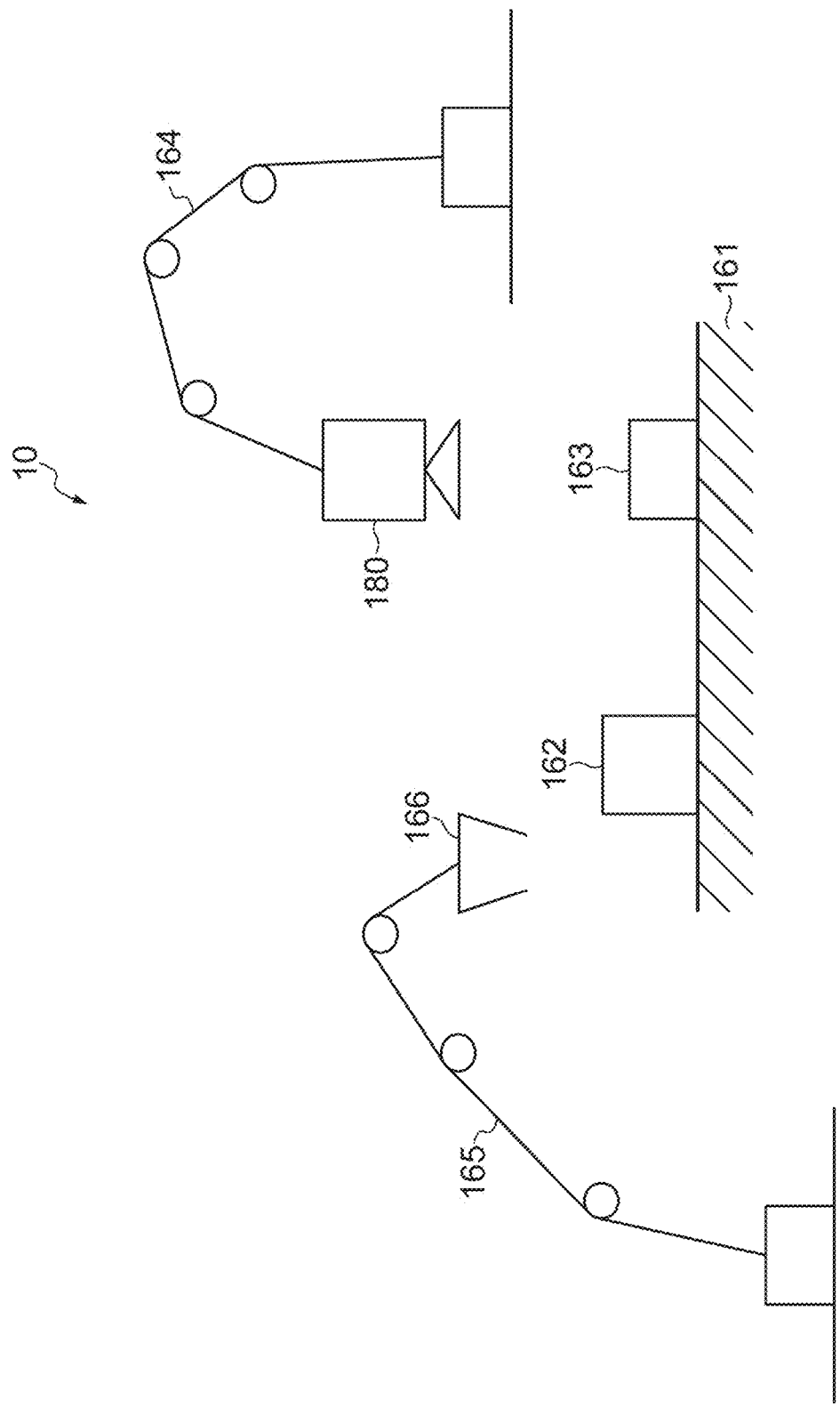
FIG. 1 is a diagram showing an overall configuration of a system according to a first embodiment.

Hereinafter, each embodiment will be described with reference to the drawings. FIG. 1 is a diagram showing an overall configuration of a system 10 according to a first embodiment. The system 10 includes a belt conveyor 161, a first robot 164, and a second robot 165. The belt conveyor 161 has a movable mounting surface, and one or more articles are mounted on the mounting surface. The article may be mounted on a resting mounting surface. In the example of FIG. 1, articles 162 and 163 having different heights are mounted on the belt conveyor 161. The first robot 164 is configured of an articulated robot arm, and an image pickup apparatus 180 is attached to the tip end thereof. The second robot 165 is configured of an articulated robot arm as in the case of the first robot 164, and a pickup apparatus 166 is attached to the tip end thereof.

The image pickup apparatus 180 shoots an article conveyed by the belt conveyor 161. The article is a recognition target. Hereinafter, it is assumed that a plurality of types of articles are mounted on the belt conveyor 161. In each embodiment, an example will be described in which the image pickup apparatus 180 has functions of an image processing apparatus (article recognition unit 107 described below). Note, however, that each embodiment can be applied even when the image processing apparatus and the image pickup apparatus 180 are provided separately and are connected to each other. The article recognition unit 107 detects the position of an article based on an image shot by the image pickup apparatus 180, and recognizes the quality state of the article. For example, the article recognition unit 107 recognizes cracks or discoloration of an article, the finish of polishing processing, and the like. The first robot 164 and the second robot 165 are communicably connected by a predetermined communication method. Information regarding the position and quality state of the article recognized by the article recognition unit 107 is transmitted from the image pickup apparatus 180 to the second robot 165. The second robot 165 controls the rotating shaft to select and pick up articles according to the recognized quality state of the articles. Hereinafter, a method for detecting the position of an article and recognizing the quality state of the detected article will be described.

While the example of FIG. 1 shows an example in which two robots, the first robot 164 and the second robot 165, are provided separately, the number of robots to be used may be one. For example, when the image pickup apparatus 180 is attached to any of a plurality of links of the second robot 165 having the articulated structure, only one robot is used. Even in such a case, each embodiment can be applied.

Figure 2:
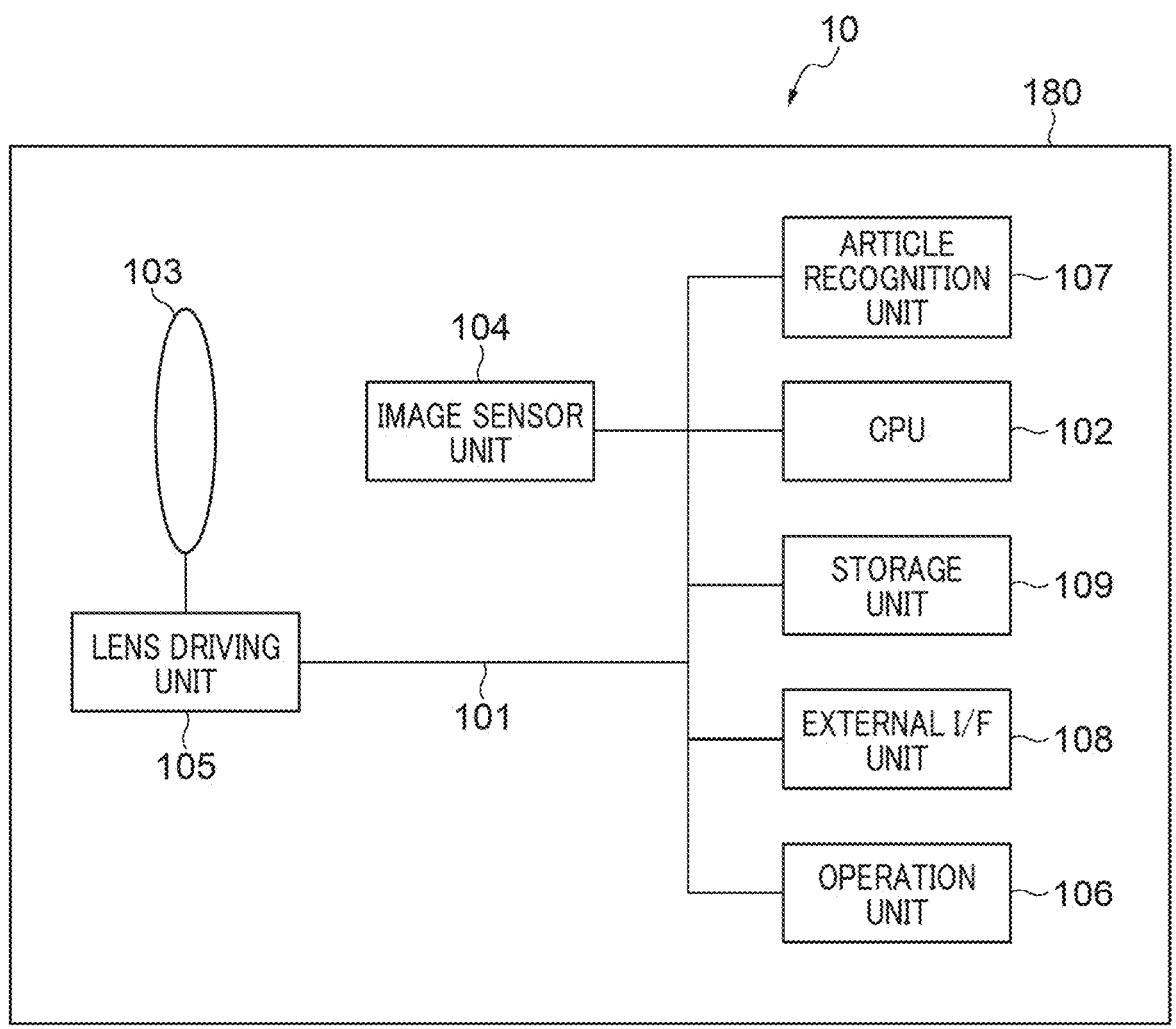
FIG. 2 is a diagram showing an example of an image pickup apparatus.

FIG. 2 is a diagram showing an example of the image pickup apparatus 180. The image pickup apparatus 180 includes a bus 101, a CPU 102, a taking lens 103, an image sensor unit 104, a lens driving unit 105, an operation unit 106, the article recognition unit 107, an external interface unit 108, and a storage unit 109. Information regarding the position and quality state of the article recognized by the article recognition unit 107 is transmitted to the second robot 165.

Units of the image pickup apparatus 180 are connected to each other through the bus 101 and controlled by the CPU 102. Light from the subject is imaged on the image sensor unit 104 through optical members such as a plurality of fixed lenses, a zoom lens, a diaphragm, and a focus lens that form the taking lens 103 as a lens unit. According to a command from the CPU 102, the lens driving unit 105 adjusts the aperture diameter of the diaphragm in the taking lens 103 to adjust the light amount at the time of shooting, and drives the zoom lens to change the focal length. Moreover, the lens driving unit 105 controls the movement of the focus lens according to the amount of shift of the focus position based on a focus detection signal of the taking lens 103, and achieves automatic focus adjustment (AF) control.

A subject image formed on the image sensor unit 104 (image sensor) is converted into an electric signal by the image sensor unit 104. The image sensor unit 104 is a photoelectric conversion element that photoelectrically converts a subject image (optical image) into an electric signal. The image sensor unit 104 is configured of a pixel unit having a plurality of microlenses and a plurality of photoelectric conversion elements corresponding to each microlens. A parallax image can be generated by using an image sensor having a plurality of photoelectric conversion elements (first photoelectric conversion element and second photoelectric conversion element) that share one microlens. The article recognition unit 107 generates distance information from the parallax image. Details of the article recognition unit 107 will be described later.

Figure 3:
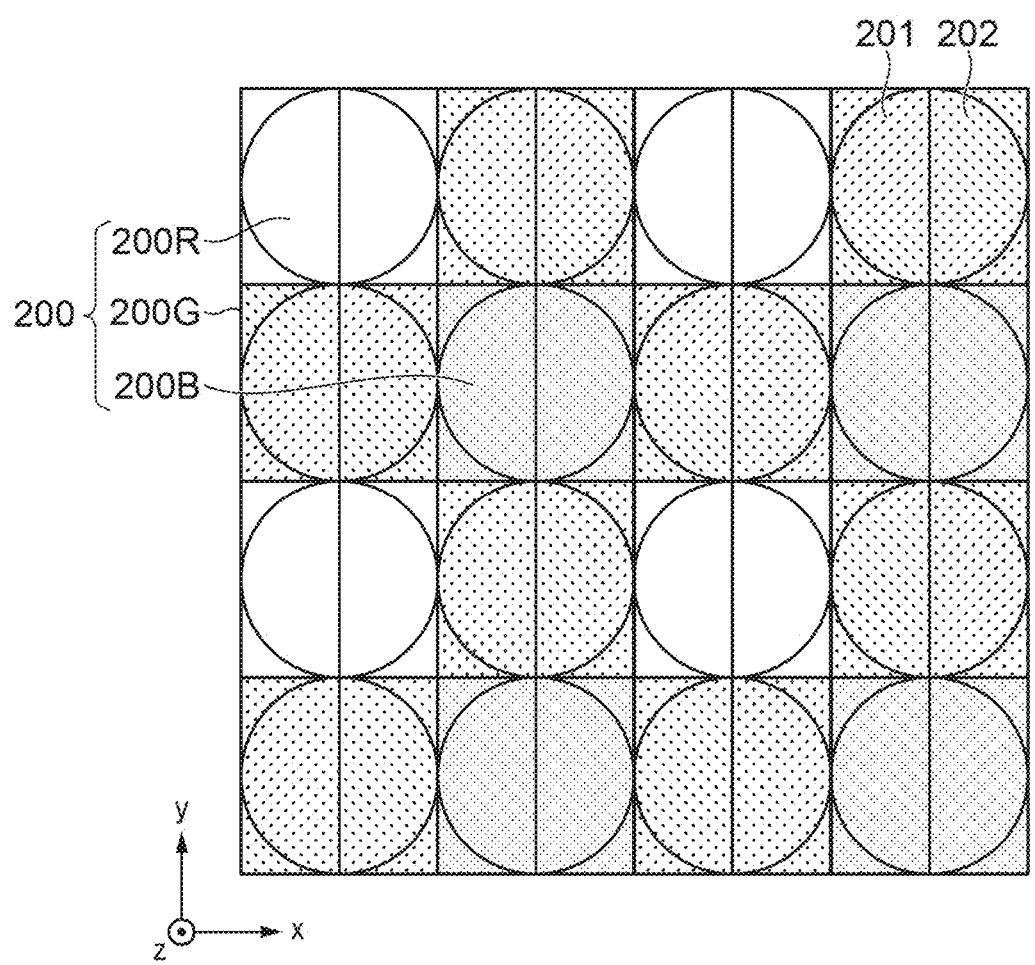
FIG. 3 is a diagram showing an example of a CMOS sensor.

An array of image pickup pixels and focus detection pixels of the image sensor unit 104 will be described with reference to FIG. 3. FIG. 3 is a diagram showing an example of a two-dimensionally arranged complementary metal oxide semiconductor (CMOS) sensor. In the example of FIG. 3, the image pickup pixels are arranged in "four columns×four rows", and the focus detection pixels are arranged in "eight columns×four rows". The arrangement mode is not limited to the example of FIG. 3. A pixel group 200 is configured of image pickup pixels of "two columns× two rows". The pixel group 200 includes a set of pixels 200R, 200G, and 200B. The pixel 200R is a pixel having a red (R) spectral sensitivity. The pixel 200G is a pixel having a green (G) spectral sensitivity, and two pixels 200G are included in the pixel group 200. The pixel 200B is a pixel having a blue (B) spectral sensitivity.

Each image pickup pixel is configured of a first focus detection pixel 201 and a second focus detection pixel 202 of "two columns×one row". By arranging a large number of image pickup pixels in "four columns×four rows" (focus detection pixels in "eight columns×four rows") in a lattice pattern on a plane in FIG. 3, a captured image signal and a focus detection signal are acquired. In the present embodiment, light reception signals of the first focus detection pixels 201 of the captured pixels in the image sensor unit 104 are collected to generate an "A image" which is a first focus detection signal. Additionally, light reception signals of the second focus detection pixels 202 of the image pickup pixels are collected to generate a "B image" which is a second focus detection signal. The article recognition unit 107 performs processing for calculating an image shift amount from the A image and the B image having parallax, and calculating distance information (depth information) based on the calculated image shift amount. Additionally, by adding together the A image and the B image to generate an "A+B image" for each captured pixel of the image sensor unit 104, a captured image used for display, recording, or the like can be generated. The image signal formed on the image sensor unit 104 and generated by photoelectric conversion is output to the article recognition unit 107.

The operation unit 106 of FIG. 2 has various operation switches. The operation unit 106 is used when an operator (user) operates the image pickup apparatus 180. An operation on the operation unit 106 is sent to the CPU 102 through the bus 101 as an operation instruction signal. The CPU 102 determines parameter setting values based on the operation instruction signal. The CPU 102 recognizes height information on an article as one of the parameter setting values. The operator can use the operation unit 106 to designate height information on an article. Height information on an article may be designated by a numerical value using the operation unit 106, for example. Additionally, when the storage unit 109 stores height information for each article, the operator may input information for identifying an article using the operation unit 106 to designate the height information on the article. The designated height information on the article is stored in the storage unit 109. The article recognition unit 107 uses the height information on the article and performs recognition processing for recognizing the quality state of an article.

A parallax image including the A image and the B image and a captured image of the A+B image are input to the article recognition unit 107 from the image sensor unit 104. The article recognition unit 107 uses the input parallax image to find the distance (first distance) between the camera and the article as the subject. The article recognition unit 107 uses various information to narrow down the area for which the quality state is to be recognized, and performs processing for recognizing the quality state of the articles included in the narrowed down area. The article recognition unit 107 outputs the result of recognition processing (recognition result) to the external interface unit 108. The external interface unit 108 transmits the recognition result to the second robot 165 by wired communication or wireless communication. The second robot 165 controls the pickup apparatus 166 based on the recognition result.

Figure 4A:
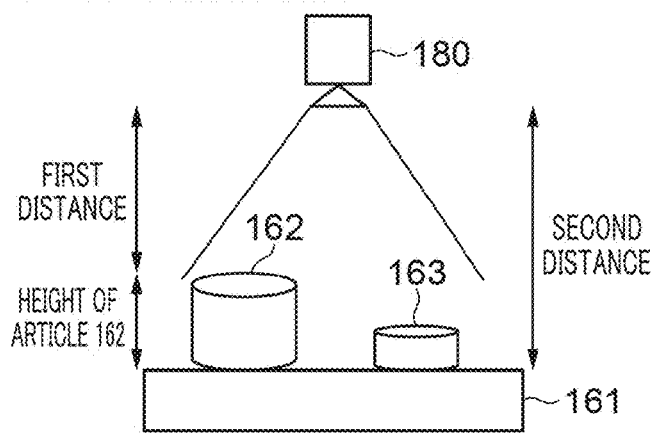
FIG. 4A is a diagram showing an example of a shooting environment of the first embodiment.
Figure 4B:
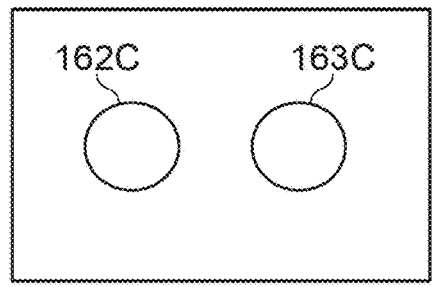
FIG. 4B is a diagram showing an example of a captured image of the first embodiment.
Figure 4C:
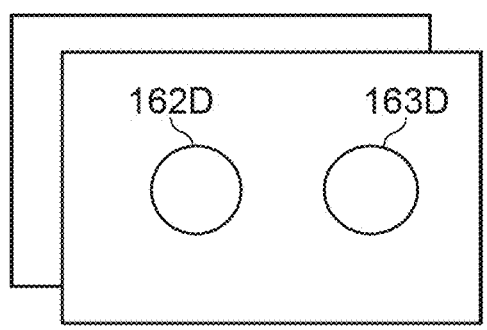
FIG. 4C is a diagram showing an example of a parallax image of the first embodiment.

FIGS. 4A to 4F are diagrams showing an example of an article recognition method of the first embodiment. FIG. 4A shows an example of a shooting environment. The image pickup apparatus 180 shoots the articles 162 and 163 mounted on the operating belt conveyor 161. In the first embodiment, the articles 162 and 163 have different heights. FIG. 4B shows a captured image. In the captured image (A+B image), the article 162 is shown as an article image 162C and the article 163 is shown as an article image 163C. FIG. 4C shows a parallax image. In the parallax image (A and B images), the article 162 is shown as an article image 162D and the article 163 is shown as an article image 163D. The captured image and the parallax image are acquired by the image sensor unit 104 of the image pickup apparatus 180.

Figure 4D:
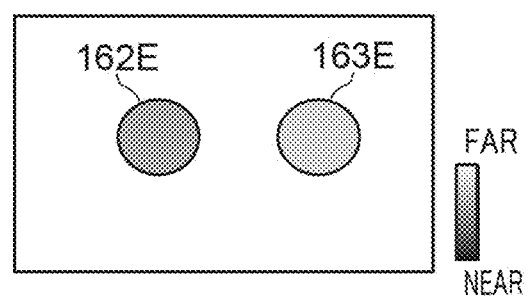
FIG. 4D is a diagram showing an example of distance information of the first embodiment.

FIG. 4D is a diagram showing distance information indicating the distance from the image pickup apparatus 180 to the subject (article). The article recognition unit 107 obtains distance information indicating the distance from the image pickup apparatus 180 to the article 162 and the distance from the image pickup apparatus 180 to the article 163 based on the parallax image. In FIG. 4D, the article 162 is shown as an article image 162E and the article 163 is shown as an article image 163E. In FIG. 4D, the distance between the image pickup apparatus 180 and the article is represented by the density of the article image. Since an article whose article image has high density is close to the image pickup apparatus 180, the first distance is short. On the other hand, since an article whose article image has low density is far from the image pickup apparatus 180, a second distance is long. In the example of FIG. 4D, the article 162 is closer to the image pickup apparatus 180 than the article 163.

Figure 4E:
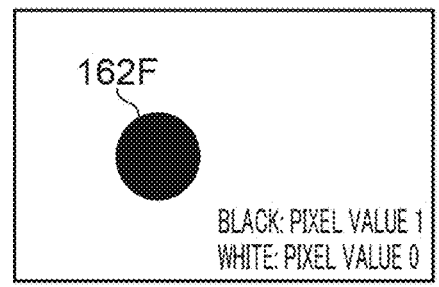
FIG. 4E is a diagram showing an example of mask image data of the first embodiment.
Figure 4F:
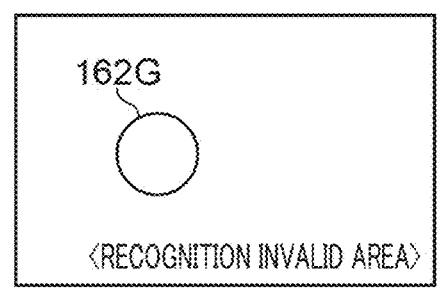
FIG. 4F is a diagram showing an example of a recognition image of the first embodiment.

FIG. 4E is a diagram showing an example of mask image data. Mask image data represents the position and coordinates of an article. A pixel having a pixel value of "1" in the image represents the position of a recognition target article. The article image 162F in FIG. 4E shows the article 162. Mask image data is data in which the position of a recognition target is expressed as an image, as shown in FIG. 4E. Mask image data is used to narrow down the area for which to perform quality state recognition processing. FIG. 4F is a diagram showing a recognition image in which an area is narrowed down using mask image data. The article recognition unit 107 uses the captured image and the mask image data to generate a recognition image. The article recognition unit 107 recognizes the quality state of an article using the recognition image.

Figure 5:
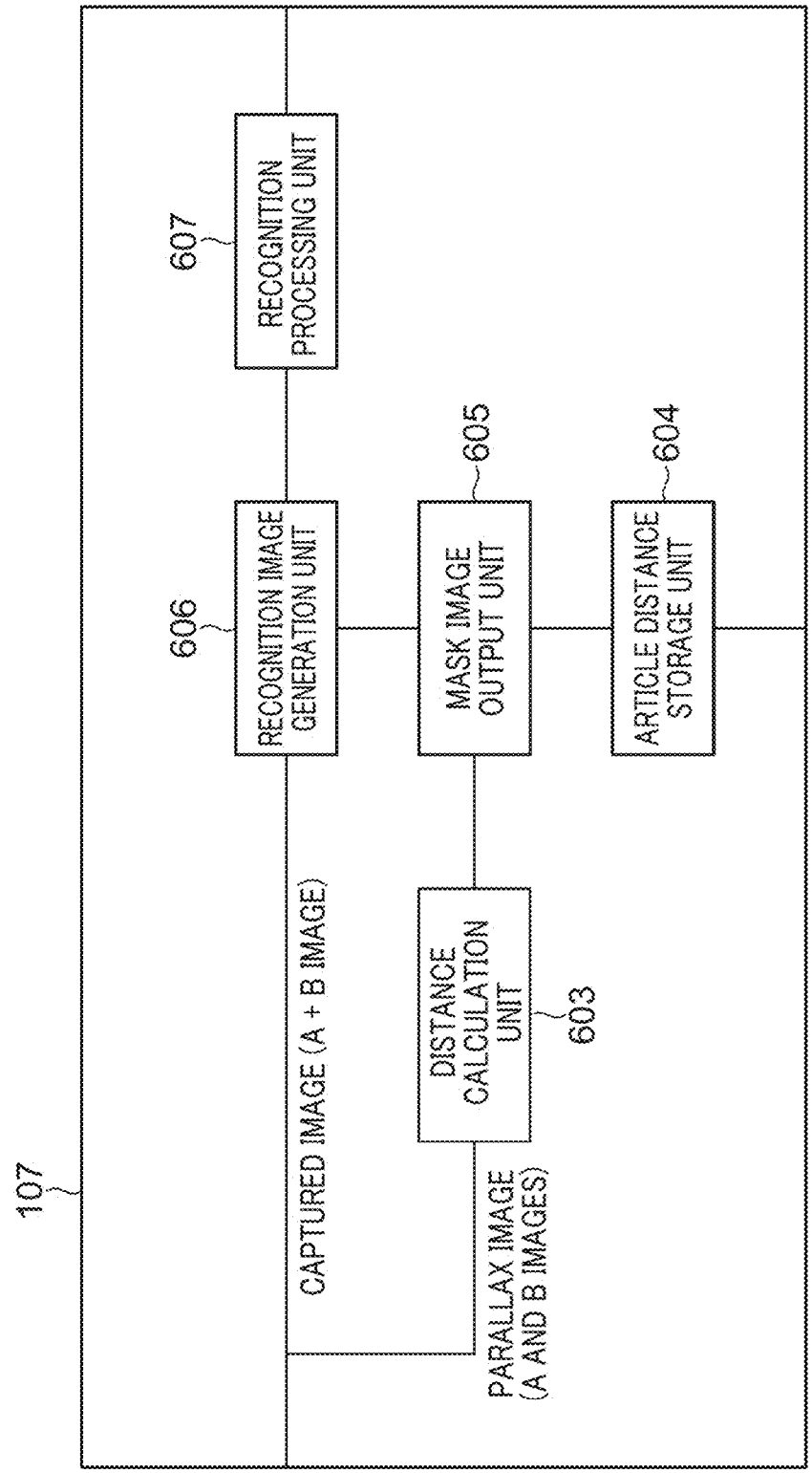
FIG. 5 is a functional block diagram of an article recognition unit.

FIG. 5 is a functional block diagram of the article recognition unit 107. The article recognition unit 107 includes a distance calculation unit 603, an article distance storage unit 604, a mask image output unit 605, a recognition image generation unit 606, and a recognition processing unit 607. The article recognition unit 107 extracts a predetermined area from an image captured by the image pickup apparatus 180, and performs recognition processing on the extracted area. The article recognition unit 107 corresponds to an extraction unit and a recognition unit.

The article recognition unit 107 includes a CPU, a RAM, and a ROM, for example. In this case, a program stored in the ROM is expanded in the RAM, and the CPU executes the program expanded in the RAM to implement the function of the article recognition unit 107. The article recognition unit 107 may be implemented by an arbitrary processor such as the CPU or a predetermined programming circuit (FPGA or the like). As described above, the article recognition unit 107 may be a single image processing apparatus. In this case, for example, the image processing apparatus that implements the function of the article recognition unit 107 and the image pickup apparatus 180 (image processing apparatus that does not include article recognition unit 107) communicate with each other. As a result, control of each embodiment is performed.

The captured image and the parallax image described above are input to the article recognition unit 107. The distance calculation unit 603 acquires a pair of images (A image and B image) having a parallax in the horizontal direction, and calculates the distance (first distance) between the article as the subject and the image pickup apparatus 180. The distance calculation unit 603 can detect an image shift amount by performing correlation calculation processing on the pair of images having a parallax in the horizontal direction. In the image shift amount detection processing, correlation calculation is performed for each small block obtained by dividing an image area into small areas, for example. The image shift amount calculated by the correlation calculation is a value that is proportional to the distance from the image pickup apparatus 180 to the subject (article). The distance can be obtained by multiplying the image shift amount by a predetermined conversion coefficient. Information on distance distribution in which the calculated distance is allocated to each pixel of the image on the imaging surface is referred to as distance information. Since the article 162 and the article 163 have different heights, the perspective is displayed with the brightness values corresponding to the heights of the article 162 and the article 163, as shown in the example of FIG. 4D.

The article distance storage unit 604 stores the height information on the article designated by the CPU 102 by operating the operation unit 106, and information on the distance (second distance) between the image pickup apparatus 180 and the belt conveyor 161. For example, assume that the belt conveyor 161 is not operating and no article is mounted on the belt conveyor 161. In this state, the image pickup apparatus 180 is arranged above the belt conveyor 161, and the image pickup apparatus 180 takes one shot. As a result, the image pickup apparatus 180 can shoot a surface (mounting surface) of the belt conveyor 161. The distance calculation unit 603 obtains the distance (second distance) between the image pickup apparatus 180 and the belt conveyor 161 based on the parallax image, and stores the information on the second distance in the article distance storage unit 604.

The mask image output unit 605 acquires, from the article distance storage unit 604, height information on the recognition target article and information on the distance (second distance) between the image pickup apparatus 180 and the belt conveyor 161. As described above, the recognition target article can be designated by the user using the operation unit 106. For example, an ID (identification ID) for identifying the article and the height information on the article are stored in association with each other in the article distance storage unit 604. The mask image output unit 605 acquires, from the article distance storage unit 604, height information on the article corresponding to the identification ID designated by the operator using the operation unit 106. Additionally, the mask image output unit 605 acquires the distance (first distance) between the image pickup apparatus 180 and the subject (article) from the article distance storage unit 604.

FIG. 4A shows the relationship among the height of articles, the first distance, and the second distance. The mask image output unit 605 applies an evaluation formula represented by the following mathematical expression (1) to all the pixels of the image of FIG. 4D. The mask image output unit 605 sets the pixels satisfying the evaluation formula to "1" and the pixels not satisfying the evaluation formula to "0", and outputs a mask image data.

$$\text{"First distance+Height of designated article−Second distance} \leq \text{predetermined threshold"} \quad (1)$$

The above evaluation formula (mathematical expression (1)) is a formula for determining whether a value obtained by subtracting the second distance from the sum of the first distance and the height of the designated article is equal to or less than a predetermined threshold. A sufficiently small value can be set as the predetermined threshold. For example, a distance having the minimum resolution that the distance calculation unit 603 can measure, for example, can be set as the predetermined threshold. FIG. 4E shows mask image data as a result of applying the above evaluation formula to the image of the distance information of FIG. 4D.

The recognition image generation unit 606 acquires an A+B image, which is a captured image, from the image sensor unit 104, and acquires mask image data from the mask image output unit 605. The recognition image generation unit 606 performs a logical product operation on the acquired captured image (A+B image) pixel by pixel with the mask image data. Then, the recognition image generation unit 606 extracts pixels whose pixel values are not "0", generates a recognition image as shown in FIG. 4F, and outputs the generated recognition image to the recognition processing unit 607. The recognition processing unit 607 performs predetermined recognition processing on the received recognition image to recognize the quality state of the article. As an example of the predetermined recognition processing, processing using a convolutional neural network (CNN) in which machine learned parameters are set is applied. Note, however, that an arbitrary machine learning method may be applied as the predetermined recognition processing. Additionally, an arbitrary neural network system other than a CNN may be applied as the predetermined recognition processing.

Figure 6A:
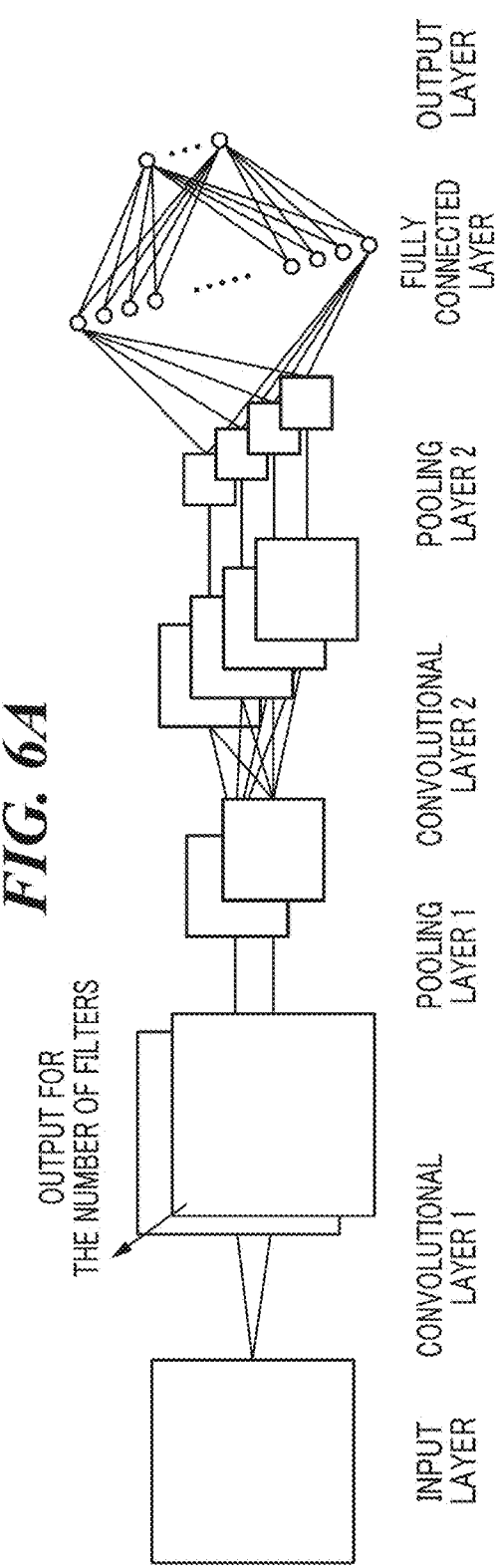
FIG. 6A is a diagram showing an example of a CNN.
Figure 6C:
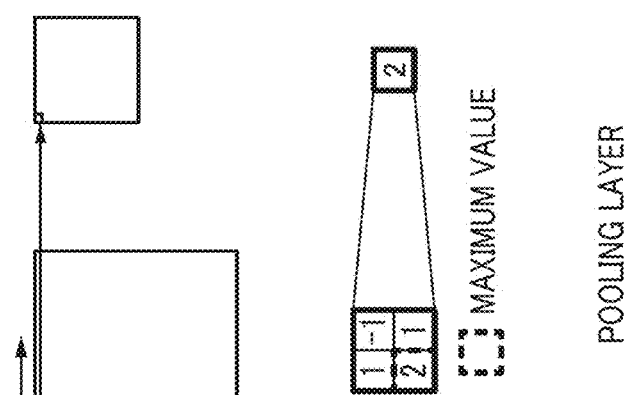
FIG. 6C is a diagram showing an example of a pooling layer.
Figure 6B:
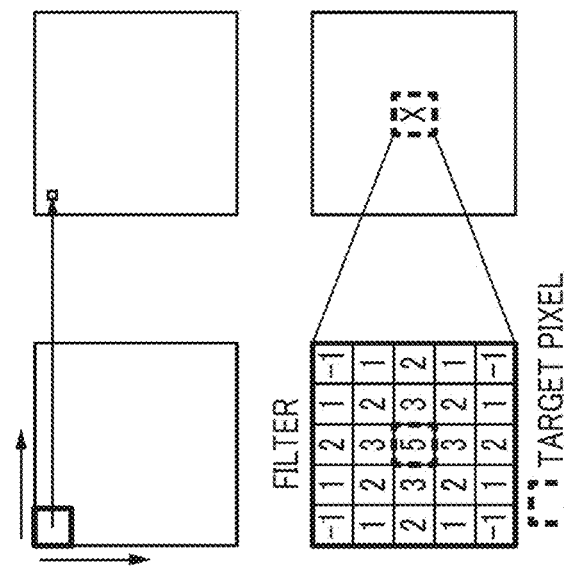
FIG. 6B is a diagram showing an example of a convolutional layer.

An example of the recognition processing using a CNN will be described with reference to FIG. 6. As shown in FIG. 6A, a CNN is generally configured of an input layer, an intermediate layer, a fully connected layer, and an output layer. An image normalized to a certain size is input to the input layer. The intermediate layer is configured of a plurality of convolutional layers and a plurality of pooling layers. As shown in FIG. 6B, the convolutional layer is a layer that performs convolution on the input using preliminarily machine learned filters, and an output value corresponding to each filter is obtained. As shown in FIG. 6C, the pooling layer is a layer that outputs a single value using a plurality of output values as input values, and outputs the maximum value of the plurality of input values, for example. The output of the convolutional layer and the output of the pooling layer are sometimes referred to as a feature map. The fully connected layer is a layer that connects the outputs of the intermediate layer, and converts the feature map into a predetermined number of output values. The output layer is configured of nodes of the number of target labels (e.g., labels showing states of article such as state with large crack, state with small crack, and state with no crack). The final value is output from the output of the fully connected layer. The sum of the output values of the nodes corresponding to the labels is "1". Then, the CNN outputs a label corresponding to the node having the maximum output value as the inference result. In a CNN, parameters such as the weight of each filter and each layer are adjusted so as to minimize error, by using machine learning data in which an image and a correct label are a set. The adjusted parameters are also referred to as machine learned parameters.

Figure 7:
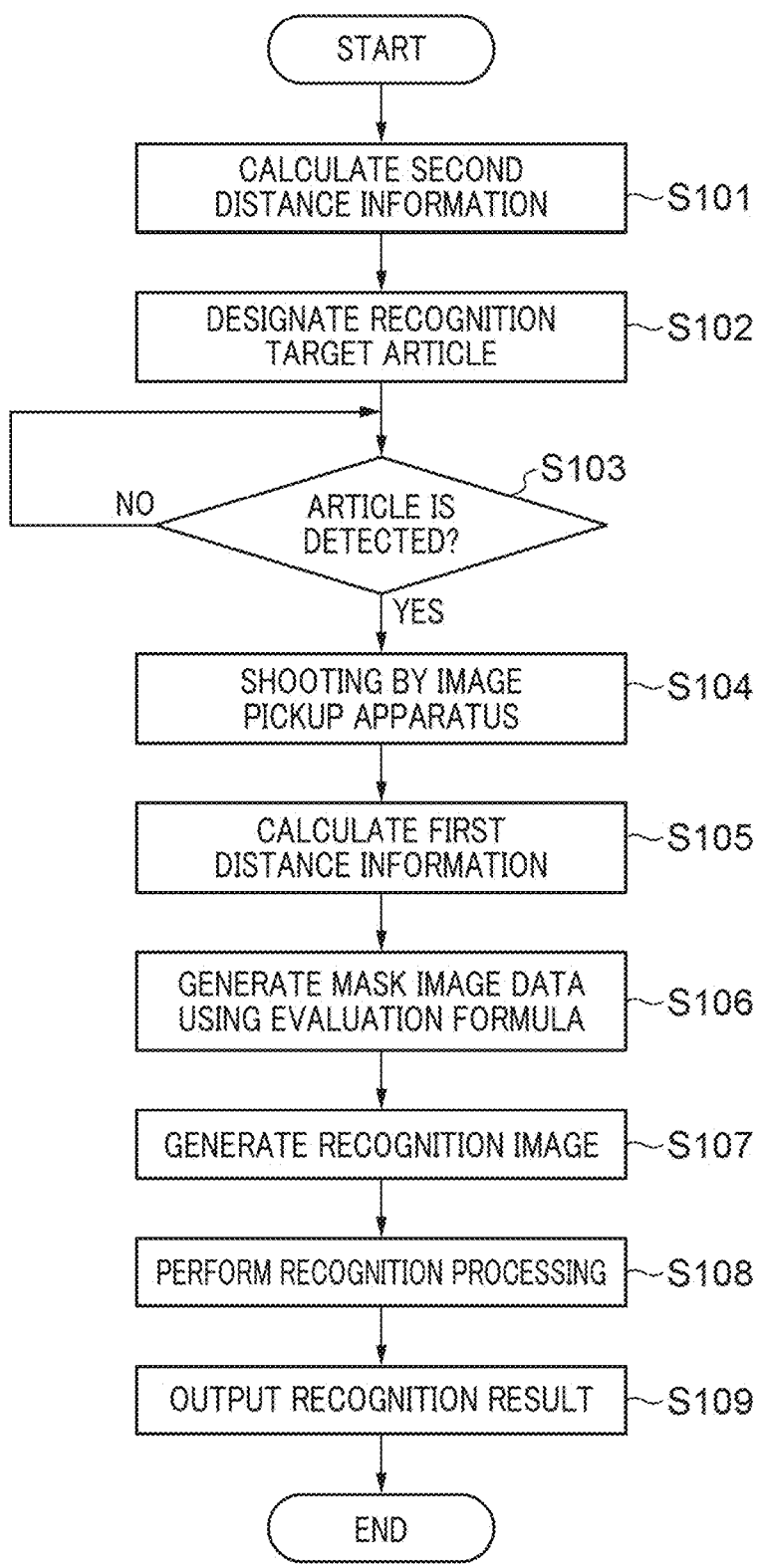
FIG. 7 is a flowchart showing the flow of processing of the first embodiment.

Next, the flow of processing of the first embodiment will be described. FIG. 7 is a flowchart showing the flow of processing of the first embodiment. The distance calculation unit 603 calculates second distance information indicating the second distance, which is the distance between the image pickup apparatus 180 and the belt conveyor 161, based on the parallax image (S101). Then, the calculated second distance information is stored in the article distance storage unit 604. The distance calculation unit 603 may calculate the second distance information by one shot while there is no article mounted on the belt conveyor 161, or may calculate the second distance information based on a plurality of shots. Then, when the user uses the operation unit 106 and designates the recognition target article, the CPU 102 accepts the designation of the recognition target article (S102).

The CPU 102 determines whether an article is mounted on the belt conveyor 161 (S103). For example, in a case where a sensor is arranged on the conveyance path of the belt conveyor 161, the CPU 102 may make the determination in S103 based on a signal from the sensor. When it is determined No in S103, the flow does not proceed to the next step. The processing of S103 may be omitted in a case where the image pickup apparatus 180 shoots continuously, for example.

When it is determined Yes in S103, the image pickup apparatus 180 starts shooting (S104). For example, as shown in FIG. 4A, the image pickup apparatus 180 shoots the articles 162 and 163 having different heights. As a result, a captured image and a parallax image are obtained. The distance calculation unit 603 calculates first distance information indicating the distances from the image pickup apparatus 180 to the articles 162 and 163 based on the parallax image (S105). The mask image output unit 605 generates mask image data using the evaluation formula described above (S106). Then, the mask image output unit 605 outputs the generated mask image data to the recognition image generation unit 606. The recognition image generation unit 606 performs a logical product operation on the mask image data and the captured image to generate a recognition image (S107). The generated recognition image is output to the recognition image generation unit 606.

Here, as shown in FIG. 4A, the height of the article 162 is larger than the height of the article 163. Accordingly, the distance from the image pickup apparatus 180 (first distance) is longer for the article 163 than for the article 162. Hence, when the height of the article 162 is designated, "first distance+height of the article" of the article 163 is longer than that of the article 162. The above-mentioned evaluation formula is "first distance+height of designated article— second distance ≤ predetermined threshold". Accordingly, in the case of the example of FIG. 4A, the article 162 satisfies the condition of the evaluation formula, and the article 163 does not satisfy the condition of the evaluation formula. As a result, the mask image data includes only the article image 162F showing the article 162, as shown in FIG. 4E. Then, as shown in FIG. 4F, only an image 162G showing the article 162 is included in the recognition image.

The recognition processing unit 607 performs recognition processing in which a CNN is applied to the recognition image (S108). Thus, the quality of the article 162 is recognized. The recognition processing unit 607 outputs the recognition result to the CPU 102 (S109). The CPU 102 controls the external interface unit 108 to send the recognition result to the second robot 165. The second robot 165 controls the pickup apparatus 166 according to the recognition result.

As described above, according to the present embodiment, it is possible to perform recognition processing on an area narrowed down according to the height of a designated article, instead of on an entire image captured by the image pickup apparatus 180. As a result, the processing amount of the recognition processing is smaller than that in the case of performing the recognition processing on the entire image, and the work target article can be recognized efficiently. For example, when performing recognition processing using a CNN, the CPU or the GPU performs a large amount of sum-of-product operation processing. In the present embodiment, since the area for performing the recognition processing is narrowed down, it is possible to reduce the operation amount of the sum-of-product operation performed by the CPU or the GPU, and reduce the operation load.

While an example in which two articles are mounted on the belt conveyor 161 has been described in the example of FIG. 4, the number of articles may be three or more. Of the plurality of articles mounted on the belt conveyor 161, all the articles may have different heights, or some of the articles may have different heights.

Additionally, the position of the image pickup apparatus 180 attached to the second robot 165 may be fixed or variable. When the position of the image pickup apparatus 180 changes, the second distance, which is the distance from the image pickup apparatus 180 to the belt conveyor 161, also changes. For example, when the CPU 102 detects that the position of the image pickup apparatus 180 has changed, the second distance information indicating the second distance is changed. The second distance information can be obtained based on the amount of angular change of the rotation axis of each joint in the robot arm of the second robot 165. Additionally, the image pickup apparatus 180 may reshoot the belt conveyor 161 with no article mounted thereon, and the distance calculation unit 603 may recalculate the second distance information.

Additionally, the shooting position of the article by the image pickup apparatus 180 is preferably the center of the image. The distance information calculated by the distance calculation unit 603 is affected by lens distortion and the like. For this reason, the error in the distance information calculated by the distance calculation unit 603 increases as the shooting position of the recognition target article moves away from the center of the image. Hence, the image pickup apparatus 180 shoots when the shooting position of the article conveyed by the belt conveyor 161 comes to the center of the image. As a result, the error of the distance information can be reduced.

On the other hand, the shooting position of the article by the image pickup apparatus 180 may be away from the center of the image. In this case, the position of the recognition target article cannot be correctly detected, an area smaller than the article is detected as mask image data, and the article recognition processing cannot be performed accurately. That is, the recognition processing unit 607 will not correctly recognize the quality state of the article. Hence, when it is detected that the shooting position of the article is away from the center of the image, the mask image output unit 605 changes the predetermined threshold in the evaluation formula. This makes it possible to recognize the quality state of the article. That is, the mask image output unit 605 increases the predetermined threshold of the evaluation formula as the shooting position of the article moves away from the center of the image. This reduces the influence of error factors such as lens distortion. Accordingly, it is possible to avoid a case where the mask image output unit 605 detects an area smaller than the recognition target article as mask image data, and it is possible to recognize the quality state of the recognition target article.

Second Embodiment

Next, a second embodiment will be described. While the recognition processing unit 607 performs recognition processing on a single article in the first embodiment, in the second embodiment, a recognition processing unit 607 performs recognition processing on a plurality of article images. Since the configuration of an article recognition unit 107 is similar to that of the first embodiment, the description thereof will be omitted.

For example, assume that the user uses an operation unit 106 to perform an operation of designating height information on an article 162 and height information on an article 163. A CPU 102 receives the operation. The CPU 102 outputs the height information on the article 162 and the height information on the article 163 to the article recognition unit 107. The height information on the article 162 and the height information on the article 163 are stored in an article distance storage unit 604. Additionally, assume that second distance information indicating a second distance, which is the distance from an image pickup apparatus 180 to a belt conveyor 161, is stored in the article distance storage unit 604 by a method similar to that of the first embodiment.

A distance calculation unit 603 calculates the distance from the article 162 to the image pickup apparatus 180 and the distance from the article 163 to the image pickup apparatus 180 based on a parallax image. The calculation result is output to a mask image output unit 605. The mask image output unit 605 generates mask image data A using the above-described evaluation formula based on the height information on the article 162, the above-described calculation result, and the second distance information. Similarly, the mask image output unit 605 generates mask image data B using the above-described evaluation formula based on the height information on the article 163, the above-described calculation result, and the second distance information. That is, the mask image data A is mask image data for the article 162, and the mask image data B is mask image data for the article 163.

A recognition image generation unit 606 performs a logical product operation on the captured image and the mask image data A pixel by pixel to generate a recognition image A. Similarly, the recognition image generation unit 606 performs a logical product operation on the captured image and the mask image data B pixel by pixel to generate a recognition image B. The recognition processing unit 607 performs recognition processing on each of the recognition image A and the recognition image B. That is, in the second embodiment, the recognition processing unit 607 performs the recognition processing twice. Then, the recognition result is output to an external interface unit 108. When three or more pieces of mask image data are generated, the recognition processing unit 607 performs recognition processing according to the number of generated mask image data.

Here, the type of the article 162 and the type of the article 163 are different. Additionally, the recognition processing unit 607 recognizes the quality state of the article using a CNN. In the second embodiment, the recognition processing is performed by using CNNs according to the types of articles. That is, the recognition processing unit 607 performs recognition processing using a CNN-A for recognizing the quality state of the article 162 and a CNN-B for recognizing the quality state of the article 163. For this reason, the recognition processing unit 607 performs recognition processing using the CNN-A in which machine learned parameters for recognizing the quality state of the article 162 are set, and the CNN-B in which machine learned parameters for recognizing the quality state of the article 163 are set. Since the type of the article 162 and the type of the article 163 are different, the machine learned parameters of the CNN-A and the CNN-B are different. As described above, the recognition processing suitable for each of the article 162 and the article 163 can be performed.

Figure 8:
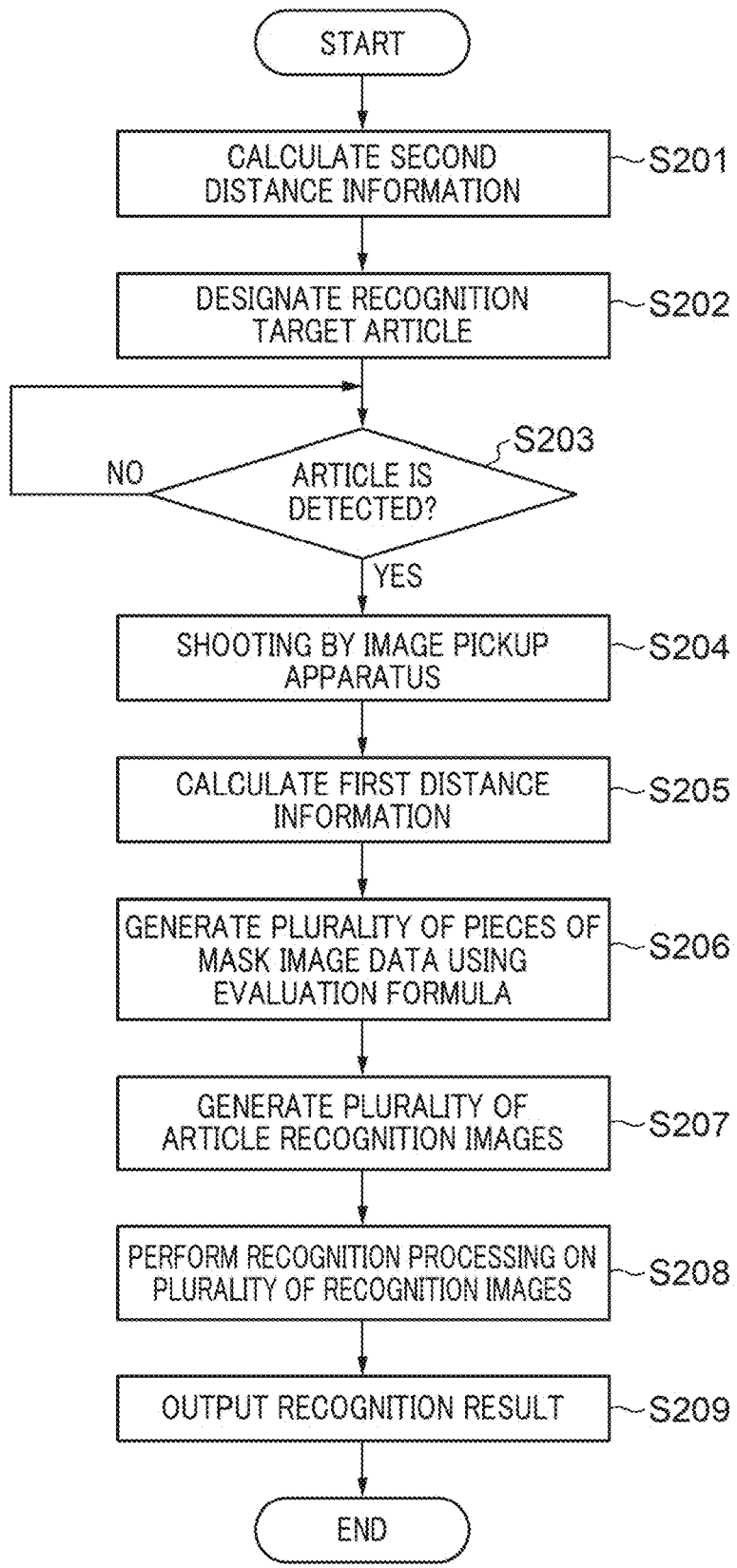
FIG. 8 is a flowchart showing the flow of processing of a second embodiment.

FIG. 8 is a flowchart showing the flow of processing of a second embodiment. Since S201 to S205 and S209 are similar to those of the first embodiment, description thereof will be omitted. The mask image output unit 605 generates a plurality of pieces of mask image data using the above-described evaluation formula (S206). The recognition image generation unit 606 performs a logical product operation on each of the plurality of pieces of mask image data and the captured image to generate a plurality of recognition images (S207). The recognition processing unit 607 performs recognition processing in which a CNN is applied to each of the plurality of recognition images (S208).

Accordingly, in the second embodiment, even when the recognition processing is performed on a plurality of articles, since the area for which to perform the recognition processing is narrowed down, the processing amount of the recognition processing can be reduced. Hence, it is possible to efficiently recognize the work target article. Here, when the recognition processing is performed on a plurality of articles having different heights, the recognition processing unit 607 performs the recognition processing a plurality of times. When the recognition processing unit 607 has a plurality of functions for performing recognition processing, the functions may perform the recognition processing for a plurality of articles in parallel.

Third Embodiment

Next, a third embodiment will be described. In the third embodiment, a recognition processing unit 607 recognizes the quality states of a plurality of articles having the same height. Hereinafter, a description will be given on the assumption that two articles 172 and 173 of the same type are included in the angle of view of an image pickup apparatus 180. The height of the two articles 172 and 173 is the same. Note, however, that the heights of the articles need only be substantially the same, and some errors may be included. Additionally, the number of articles is not limited to two.

Figure 9:
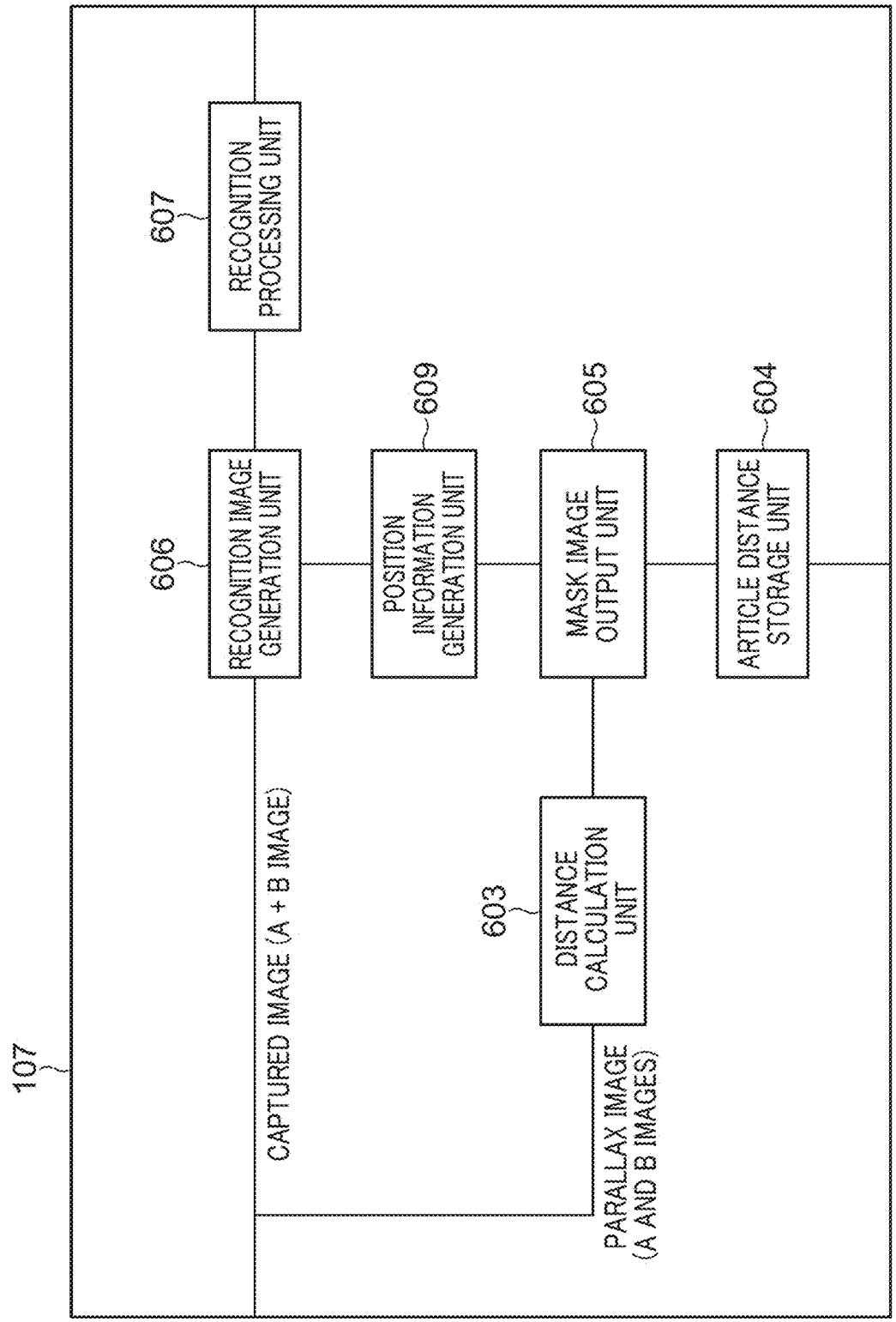
FIG. 9 is a functional block diagram of an article recognition unit of a third embodiment.

FIG. 9 is a functional block diagram of an article recognition unit 107 of the third embodiment. The article recognition unit 107 of the third embodiment is different from the first and second embodiments in that it has a position information generation unit 609. Details of the position information generation unit 609 will be described later. FIGS. 10A to 10F are diagrams showing an example of an article recognition method of the third embodiment. As in the case of the above embodiments, the article recognition unit 107 of the third embodiment, too, recognizes cracks or discoloration of an article, the finish of polishing processing, and the like. Hereinafter, an example will be described in which the article recognition unit 107 recognizes whether an article has a large crack, a small crack, or no crack. The article recognition unit 107 may recognize quality states of an article other than cracks. Additionally, the article recognition unit 107 recognizes the quality state of an article by using, on an input image, a CNN in which machine learned parameters are set.

Figure 10A:
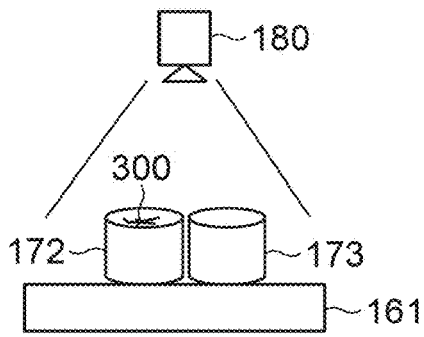
FIG. 10A is a diagram showing an example of a shooting environment of the third embodiment.
Figure 10B:
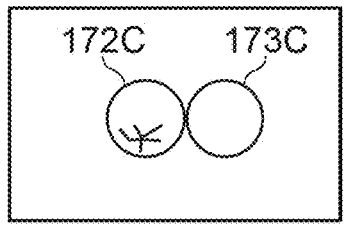
FIG. 10B is a diagram showing an example of a captured image of the third embodiment.
Figure 10C:
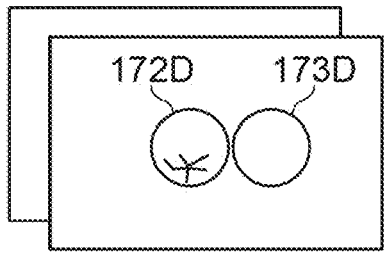
FIG. 10C is a diagram showing an example of a parallax image of the third embodiment.

FIG. 10A is a diagram showing an example of a shooting environment of the third embodiment. The same type of articles 172 and 173 are included in the field of view of the image pickup apparatus 180. The height of the article 172 and the height of the article 173 are the same. The articles 172 and 173 are mounted on a belt conveyor 161. The article 172 has a crack 300, and the quality state of the article 172 is abnormal. FIG. 10B is a diagram showing a captured image. In the captured image, an article image 172C shows the article 172 and an article image 173C shows the article 173. FIG. 10C is a diagram showing a parallax image. In the parallax image, an article image 172D shows the article 172 and an article image 173D shows the article 173.

Figure 10D:
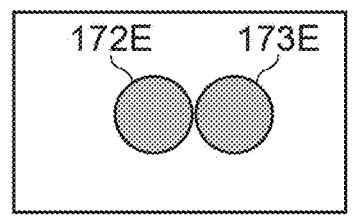
FIG. 10D is a diagram showing an example of distance information of the third embodiment.
Figure 10E:
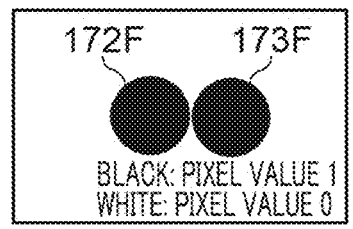
FIG. 10E is a diagram showing an example of mask image data of the third embodiment.

A distance calculation unit 603 obtains a first distance, which is the distance between the image pickup apparatus 180 and the subject (article), based on the parallax image. FIG. 10D is a diagram showing distance information. In the image, an article image 172E shows the article 172 and an article image 173E shows the article 173. Since the article 172 and the article 173 have the same height, the distance information thereof is the same. FIG. 10E is a diagram showing mask image data. Since the article 172 and the article 173 have the same height, both the article image 172E and the article image 173E are extracted. The mask image data of the first embodiment described above includes one article image 162F. On the other hand, the mask image data of the third embodiment includes two article images 172F and 173F. Accordingly, the article image included in the mask image data of the third embodiment has a complicated shape, and it is necessary to distinguish between the article image 172E and the article image 173E in the complicated shape.

The position information generation unit 609 generates position information from the mask image data output by the mask image output unit 605. The position information generation unit 609 corresponds to a detection unit. The position information generation unit 609 detects the positions of a plurality of articles individually even when the mask image data includes a plurality of article images. For this reason, the position information generation unit 609 receives the mask image data as input, performs region CNN (R-CNN) processing, detects the number of articles, and generates article position information. As the R-CNN, a method described in a document (Rich feature hierarchies for accurate object detection and semantic segmentation, Ross Girshick, Jeff Donahue, Trevor Darrel, Jitendra Malik, IEEE Conference on Computer Vision and Pattern Recognition (CVPR), 2014) can be applied, for example.

The article position information (information regarding position of article) generated by the position information generation unit 609 performing the R-CNN processing is represented by the position of the article, the center coordinates of a rectangular area, and the size. The R-CNN is a method of inferring not only the object in the image but also the position of the object, and the article position information described above may be other information regarding the position of the article. The R-CNN is a machine learning model in which machine learned parameters are set. Additionally, the position information generation unit 609 may detect an article and the position of the article in an image using any machine learning method other than the R-CNN.

Here, many operations are performed to perform the R-CNN processing. At this time, since the mask image data is data expressed in binary, the operation amount is smaller than that of the R-CNN processing for an image having RGB pixel values (8 bits each). Additionally, since the R-CNN processing is performed only on the pixels corresponding to the position of the article, the R-CNN processing can be performed with a small amount of hardware resource. Each parameter of the R-CNN has been machine learned in advance. For example, preliminary machine learning of the R-CNN is performed by inputting a plurality of pieces of mask image data and correct data (data indicating correct area in mask image data) of an article. As a result, each parameter of the R-CNN is machine learned and adjusted.

Figure 10F:
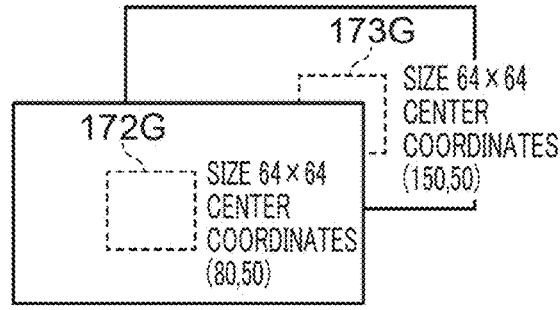
FIG. 10F is a diagram showing an example of a recognition image of the third embodiment.

Then, the position information generation unit 609 receives the mask image data output by the mask image output unit 605 as input, detects the number of a plurality of articles included in the mask image data according to the processing of the machine learned R-CNN, and generates the article position information for each of the detected articles. Additionally, FIG. 10F is a diagram showing article position information 172G about the article 172 and article position information 173G about the article 173. As shown in FIG. 10F, according to the R-CNN processing using the mask image data as input, two articles are detected, and the article position information for each of the two articles is generated.

Figure 10G:
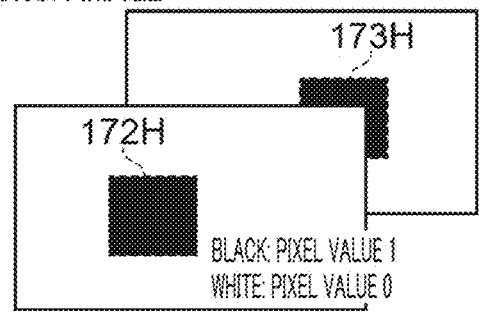
FIG. 10G is a diagram showing a position image of the third embodiment.

Based on the article position information, the position information generation unit 609 generates an image (hereinafter referred to as position image) in which the pixel value of a corresponding area in the image is "1" and the pixel value of the other areas is "0". FIG. 10G is a diagram showing an example of the position image. Here, the position information generation unit 609 generates a position image individually for each of the article position information 172G and the article position information 173G. In the position image corresponding to the article 172, the pixel value of the area (rectangular area in FIG. 10G) specified by the article position information 172G is "1", and the pixel value of the other areas is "0". Additionally, in the position image corresponding to the article 173, the pixel value of the rectangular area specified by the article position information 173G is "1", and the pixel value of the other areas is "0".

Figure 10H:
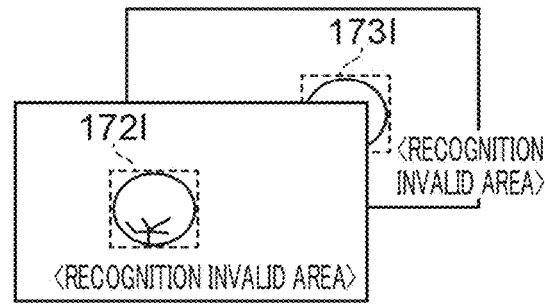
FIG. 10H is a diagram showing an example of a recognition image of the third embodiment.

A recognition image generation unit 606 generates a recognition image as shown in FIG. 10H based on the captured image shown in FIG. 10B and the position image of FIG. 10F. That is, the recognition image generation unit 606 generates a recognition image in which, of the captured image of FIG. 10B, the rectangular area of the position image of FIG. 10F is valid and the other areas are invalid. Since the position image is generated for each of the article 172 and the article 173, two recognition images are generated.

The recognition processing unit 607 performs recognition processing similar to that of the first and second embodiments on each of the two recognition images. Here, as shown in FIG. 10A, the article 172 has the crack 300. For this reason, as a result of performing the recognition processing, the recognition processing unit 607 determines that there is a problem in the quality of the article 172. That is, the quality of the article 172 is determined to be abnormal. On the other hand, as a result of performing the recognition processing, the recognition processing unit 607 determines that there is no problem in the quality of the article 173. That is, it is determined that the quality of the article 173 is normal.

As described above, the recognition processing unit 607 performs recognition processing on each of the two recognition images. Accordingly, the recognition processing is performed twice. The recognition result obtained by performing the recognition processing is output to an external interface unit 108. The external interface unit 108 transmits the recognition result to a second robot 165. The second robot 165 controls a robot arm and a pickup apparatus 166 based on the recognition result.

Figure 11:
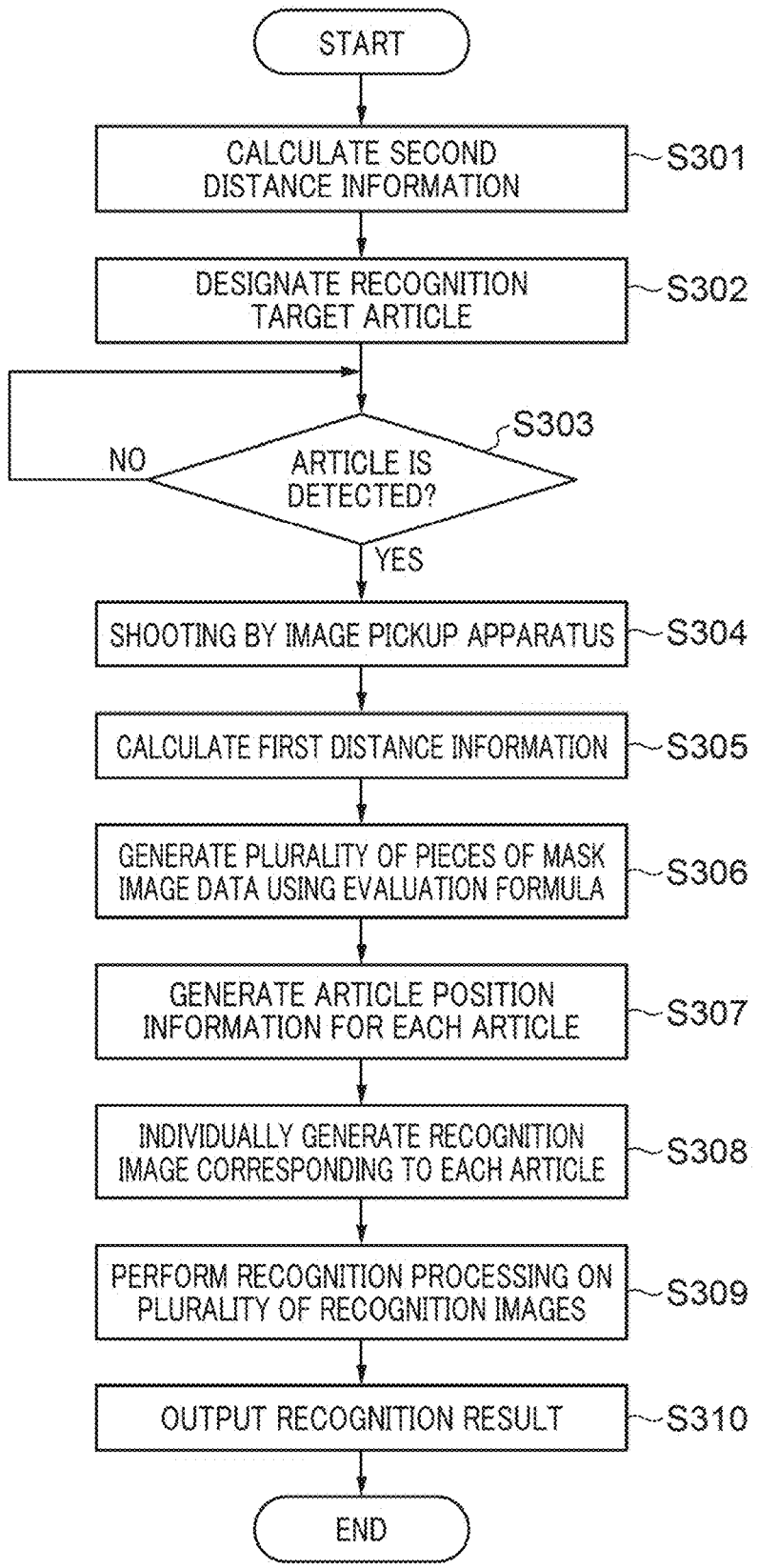
FIG. 11 is a flowchart showing the flow of processing of the third embodiment.

FIG. 11 is a flowchart showing the flow of processing of the third embodiment. Since S301 to S305 and S310 are similar to those of the first embodiment, description thereof will be omitted. The mask image output unit 605 generates a plurality of pieces of mask image data using the above-described evaluation formula (S306). The position information generation unit 609 receives the mask image data output by the mask image output unit 605 as input, and generates article position information for each of the articles included in the image according to the processing of the learned R-CNN (S307). Then, the recognition image generation unit 606 generates a recognition image corresponding to each article (S308). The recognition processing unit 607 receives a plurality of recognition images as input, and performs recognition processing by the CNN processing (S309).

Accordingly, in the third embodiment, even when the recognition processing is performed on a plurality of articles of the same type having the same height, since the area for which to perform the recognition processing is narrowed down, the processing amount of the recognition processing can be reduced. Hence, it is possible to efficiently recognize the work target article. Additionally, when the recognition processing unit 607 has a plurality of functions for performing recognition processing, the functions may perform the recognition processing for a plurality of articles in parallel.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-171076 filed on Sep. 20, 2019 which is hereby incorporated by reference herein in its entirety.

What is claimed is:

1. An image processing apparatus that processes an image of a recognition target on a mounting surface captured by an image pickup apparatus, the image processing apparatus comprising:
    an extraction unit configured to extract an area from the image based on a first distance from the recognition target to the image pickup apparatus, a height of a designated recognition target, and a second distance from the image pickup apparatus to the mounting surface; and
    a recognition unit configured to perform recognition processing on the area.

2. The image processing apparatus according to claim 1, wherein
    heights of some or all of a plurality of the recognition targets on the mounting surface are different.

3. The image processing apparatus according to claim 1, wherein
    the second distance is acquired before the recognition processing is performed, and
    the second distance is changed in response to a change in a position of the image pickup apparatus.

4. The image processing apparatus according to claim 1, wherein
    the image pickup apparatus shoots when a shooting position of the recognition target comes to the center of the image.

5. The image processing apparatus according to claim 1, wherein
    the extraction unit increases a threshold being used to extract the area to be compared with a value obtained by subtracting the second distance from the sum of the first distance and the height of the designated recognition target, as a shooting position of the recognition target moves away from the center of the image.

6. The image processing apparatus according to claim 1, wherein
    the recognition unit performs, when a plurality of areas are extracted by the extraction unit, the recognition processing on each of the plurality of extracted areas.

7. The image processing apparatus according to claim 1, further comprising:
    a detection unit configured to detect a plurality of recognition targets and positions of the plurality of recognition targets included in the image, wherein
    the recognition unit performs the recognition processing on each area of the plurality of recognition targets based on the detected positions of the plurality of recognition targets.

8. The image processing apparatus according to claim 7, wherein
    the extraction unit generates an image individually showing positions based on the detected plurality of recognition targets and the detected positions of the plurality of recognition targets, inputs the image showing the positions into a machine learning model in which machine learned parameters are set, and extracts areas each corresponding to the plurality of recognition targets, and
    the recognition unit performs the recognition processing on each of the extracted areas.

9. The image processing apparatus according to claim 8, wherein
    among pixels forming the image showing the positions, a pixel corresponding to the area is represented by 1, and a pixel not corresponding to the area is represented by 0.

10. The image processing apparatus according to claim 1, wherein
    the image processing apparatus is included in the image pickup apparatus, wherein
    the image pickup apparatus comprises an image sensor.

11. A control method of controlling an image processing apparatus that processes an image of a recognition target on a mounting surface captured by an image pickup apparatus, the control method comprising:
    extracting an area from the image by comparing a predetermined threshold and a value obtained by subtracting a second distance from the image pickup apparatus to the mounting surface from the sum of a first distance from the recognition target to the image pickup apparatus and a height of a designated recognition target; and
    performing recognition processing on the area.

12. A non-transitory computer-readable storage medium storing a computer-executable program that executes a control method of controlling an image processing apparatus that processes an image of a recognition target on a mounting surface captured by an image pickup apparatus, the control method comprising:
    extracting an area from the image by comparing a predetermined threshold and a value obtained by subtracting a second distance from the image pickup apparatus to the mounting surface from the sum of a first distance from the recognition target to the image pickup apparatus and a height of a designated recognition target; and
    performing recognition processing on the area.

* * * * *